United States Patent
Saarisalo et al.

(10) Patent No.: US 7,541,930 B2
(45) Date of Patent: Jun. 2, 2009

(54) APPARATUS AND METHOD FOR CONTROLLING DIVERSE SHORT-RANGE ANTENNAS OF A NEAR FIELD COMMUNICATIONS CIRCUIT

(75) Inventors: Mikko Saarisalo, Kantvik (FI); Pekka K. Viitaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/363,940

(22) Filed: Mar. 1, 2006

(65) Prior Publication Data

US 2007/0008140 A1 Jan. 11, 2007

Related U.S. Application Data

(63) Continuation-in-part of application No. 11/151,310, filed on Jun. 14, 2005, now Pat. No. 7,280,045.

(51) Int. Cl.
*G08B 13/14* (2006.01)
(52) U.S. Cl. .................. 340/572.7; 340/10.1; 340/505; 343/742; 455/41.1; 455/277.1
(58) Field of Classification Search ............... 455/41.1, 455/277.1; 340/572.1, 572.7, 505, 10.1, 340/539.11; 343/878–881, 741–742, 866–867; 235/375
See application file for complete search history.

(56) References Cited

U.S. PATENT DOCUMENTS

| 6,236,315 | B1 | 5/2001 | Helms et al. |
| 6,259,369 | B1 | 7/2001 | Monico |
| 7,043,269 | B2 * | 5/2006 | Ono et al. ................. 340/572.1 |
| 2001/0033600 | A1 | 10/2001 | Yang et al. |
| 2004/0046663 | A1 | 3/2004 | Jesser |
| 2004/0176032 | A1 * | 9/2004 | Kotola et al. ................ 455/41.2 |
| 2006/0052055 | A1 * | 3/2006 | Rowse et al. ................ 455/41.1 |
| 2007/0001853 | A1 * | 1/2007 | Otranen .................... 340/572.1 |

FOREIGN PATENT DOCUMENTS

| WO | 2004042959 A1 | 5/2004 |
| WO | WO 2005/008575 A1 | 1/2005 |
| WO | 2005043292 A2 | 5/2005 |
| WO | WO 2005/045744 A1 | 5/2005 |
| WO | WO 2005/093643 A1 | 10/2005 |
| WO | WO 2006/010943 A1 | 2/2006 |

OTHER PUBLICATIONS

International Search Report (Nov. 10, 2006).
Klaus Finkenzeller, "RFID Handbook, Radio-Frequency Identification Fundamentals and Applications"; pp. 35-36; 103-104, John Wiley & Sons Ltd., ISBN 0-471-98851-0 (1999).

* cited by examiner

*Primary Examiner*—Thomas J Mullen
(74) *Attorney, Agent, or Firm*—Locke Lord Bissell & Liddell

(57) ABSTRACT

An intelligent antenna system for extending the effective communication range of a machine-readable passive tag. The system may include intelligence that allows one of a plurality of extension antennas in an antenna network to be active at any given time. The machine-readable tag and antenna network may further be embedded in a structure. For example, the system may include multiple passive tags that are active in correspondence to a display or advertisement currently being exhibited. The system may include means for operatively coupling the corresponding machine-readable tag to the embedded antenna network.

17 Claims, 15 Drawing Sheets

US 7,541,930 B2

APPARATUS AND METHOD FOR CONTROLLING DIVERSE SHORT-RANGE ANTENNAS OF A NEAR FIELD COMMUNICATIONS CIRCUIT

This application is a continuation-in-part of application Ser. No. 11/151,310, filed Jun. 14, 2005, now U.S. Pat. No. 7,280,045 presently pending before the United States Patent and Trademark Office and assigned to the same assignee, to which priority under 35 § USC 120 is claimed.

BACKGROUND OF INVENTION

1. Field of Invention

The present invention relates to wireless communications. More particularly, the invention is related to a system for improving the transmission of information via short-range communication through an improved multiple antenna arrangement for expanding the otherwise limited operational coverage area of a short-range communication source.

2. Description of Prior Art

A wireless communication device (WCD) may communicate over a multitude of networks. Cellular networks facilitate WCD communications over large geographic areas. For example, the Global System for Mobile Telecommunications (GSM) is a widely employed cellular network that communicates in the 900 MHZ-1.8 GHZ band in Europe and at 1.9 GHZ in the United States. This system provides a multitude of features including audio (voice), video and textual data communication. For example, the transmission of textual data may be achieved via the Short Messaging Service (SMS). SMS allows a WCD to transmit and receive text messages of up to 160 characters. It also provides data transfer to packet networks, ISDN and POTS users at 9.6 Kbps. While cellular networks like GSM provide a global means for transmitting and receiving data, due to cost, traffic and legislative concerns, a cellular network may not be appropriate for all data applications.

Bluetooth™ is a short-range wireless network technology quickly gaining acceptance in the marketplace. A Bluetooth™ enabled WCD may transmit and receive data at a rate of 720 Kbps within a range of 10 meters, and may transmit up to 100 meters with additional power boosting. A user does not manually instigate a Bluetooth™ wireless network. A plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other members of the piconet.

More recently, manufacturers have begun to incorporate various devices for providing enhanced functionality in a WCD (e.g., hardware components and software for performing close-proximity wireless information exchanges). Sensors and/or readers may be used to read visual or electronic information into a device. A transaction may involve a user holding their WCD in proximity to a target, aiming their WCD at an object (e.g., to take a picture), sweeping the device over a tag or document, etc. Machine-readable technologies such as radio frequency identification (RFID), Infra-red (IR) communication, optical character recognition (OCR) and various other types of visual, electronic and magnetic reading are used to quickly input desired information into the WCD without the need for manual entry by a user.

Short-range communication strategies are ideal for business entities seeking to reach information consumers in a designated geographic area. Short-range communications are mostly unregulated, and are generally a cost-effective solution for making data available to a potential recipient. For example, a business may set up a local access point to service customers that come within proximity of the access point. The Nokia Local Marketing Solution and ijack™ by Telia-Sonera Finland Oyj are two examples of these local information delivery systems. These services use hardware access points communicating via Bluetooth™ to create piconets including accessible devices that come within transmission range. The service point becomes the master device, and may download price, coupon, show time, date, reservation information, etc. to a potential client. In another application, these systems may also be used to impart work-relevant data to employees or educational information to students, etc. While these systems may work automatically to impart desired information to a consumer, they are limited by the time required to both establish a network and download content. Often, an information consumer will not remain within range of an access point long enough to receive all of the information to be delivered by the device (e.g., a person strolling by a storefront), defeating the primary purpose of establishing the service point.

An alternative to downloading all of the desired information via short-range communication at the time of first contact would be to simply download a pointer, bookmark, indicator, link, etc. to the desired information. The downloaded pointer might include a website address (URL), email address, phone number, etc. that would in turn allow the device user to obtain the body of the desired information at a later time, for instance, from a dedicated short-range service point, via long-range data communication, via a wired internet connection, via a telephone, etc.

In at least one example of short-range machine-readable communication, RFID may be employed to convey several kilobytes worth of data to a reading device in a relatively short amount of time. In addition, a passive RFID transponder or "tag" does not require its own power source. The tag receives power from the reading device. Therefore, the passive tag may be imbedded in any manner of structure such as a poster, display, standee, doorway, wall, etc. A user passing near the tag may manually or automatically read the tag and receive a response including desired information in a relatively short amount of time.

Near Field Communication (NFC) Technology An RFID transponder and corresponding RFID reader constitute a one-way "listening" system that can be used, for example, in a read-only identity card that contains the user's ID. More sophisticated RFID systems may use Near Field Communication (NFC) technology for two-way "read-write" communications. NFC is different from other contactless or RFID technologies in that it has a very short operating distance and also allows two devices to conduct interactive communications. The effective distance of an NFC solution depends on the tag design and the reader, but is typically less than a few centimeters. Near Field Communication (NFC) is a combination of contactless identification and interconnection technologies that enables short-range communication between personal electronic devices. It combines the functions of a contactless reader, a contactless card and peer-to-peer functionality on a single microchip in the NFC communication logic. NFC technology operates in the 13.56 MHz frequency range and is standardized in ISO 18092 and ISO 21481, ECMA (340, 352 and 356) and ETSI TS 102 190. NFC is also compatible with contactless smart card infrastructure based on ISO 14443 A.

ISO/IEC 18092:2004 defines communication modes for Near Field Communication Interface and Protocol (NFCIP-1) using inductively coupled devices operating at the center frequency of 13.56 MHz for interconnection of computer peripherals. It also defines both the Active and the Passive communication modes of NFCIP-1 to realize a communication network using Near Field Communication devices for networked products and also for consumer equipment. This International Standard specifies modulation schemes, codings, transfer speeds and frame format of the RF interface, as well as initialization schemes and conditions required for data collision control during initialization. Furthermore, this International Standard defines a transport protocol including protocol activation and data exchange methods. Information interchange between systems includes agreement between the interchange parties upon the interchange codes and the data structure.

In both RFID and NFC systems, the already short effective communication range of the reader/tag transponder may be further limited by the configuration or composition of the structure in which it is embedded. Certain materials may interfere with radio frequency waves, requiring a user to come closer to the tag in order to make contact. The resulting situation may create a "traffic jam" of users trying to get into the same area in order to receive the desired information. Therefore, what is needed is a way to extend the effective range of the machine-readable data so that a plurality of data users over an extended effective range may receive information from the same tag.

A further problem arises for combined RFID and NFC systems where both RFID listening functions and NFC read-write functions are to be available in the same NFC communication logic. An example RFID listening function would be a read-only user ID card application where the reader merely reads the user's ID from the NFC communication logic. An example NFC read-write function would be an interactive banking application where account balances are first read from the NFC communication logic and then updated and written back into the NFC communication logic by the reader. When a single NFC communication logic has both RFID and NFC functionalities, the antenna tuning and usability constraints are different for the two functions. For the NFC reader-writer function, the distance between the reader antenna and the NFC communication logic antenna is intended to be a short distance (e.g., less than two centimeters) or actual physical contact between the reader and the NFC communication logic. For the RFID listening function, the distance between the reader antenna and the NFC communication logic antenna is intended to be a longer distance of several centimeters. A further complicating factor is that different RFID listening applications may require different minimum separation distances between the reader and the NFC communication logic. For example, the Mastercard application currently requires a minimum of 4 centimeters separation distance from either side of the NFC communication logic card to the reader, whereas the Japan Railways Suica card application requires a minimum of 10 centimeters separation distance from the NFC communication logic card to the reader. This creates a problem where the same NFC communication logic is intended to be used for different RFID listening applications that require different minimum separation distances between the reader and the NFC communication logic.

Various methods are known in the art for increasing the range of a machine-readable tag via extended antenna configurations. However, these configurations often involve a complex antenna structure hardwired to the tag intended to handle only one reading device at a time. What is needed is a method including some intelligence for determining the source of a plurality of reading signals and for adjusting the antenna system to account for these multiple readers. The system must be able to select between active sources in order to return desired information back to a reader while managing the loading of the antenna system.

SUMMARY OF INVENTION

The present invention includes an apparatus, method, program and system for extending the effective communication range of a machine-readable passive tag. The system includes intelligence that allows one of a plurality of extension antennas to be active at any given time in order to both facilitate communications and safeguard the system.

In at least one application of the invention, the machine-readable tag is embedded in a structure. The structure also includes embedded extension antennas increasing the effective range of the tag. Control logic also embedded in the structure senses a reading device in proximity to an antenna (e.g., an active antenna), and configures the system to select the active antenna until a threshold limit is reached. The control logic may then activate another antenna or may reset the system to a monitoring mode.

In a further embodiment of the invention, the system may include multiple passive embedded tags that are active in correspondence to a certain informational display or advertisement currently being exhibited. The system includes means for operatively coupling the designated machine-readable tag to the embedded antenna system previously described.

In a further embodiment of the invention, the machine-readable tag includes combined RFID and NFC functionality where both RFID listening functions and NFC read-write functions are to be available in the same NFC communication logic. The NFC communication logic chip is selectively connected to at least two antenna coils, one antenna for reading and writing and the other antenna for listening.

In a further embodiment of the invention, the machine-readable tag includes different RFID listening applications that require different minimum separation distances between the reader and the NFC communication logic. The NFC communication logic chip is selectively connected to at least two antenna coils, a first antenna coil for operating with a first minimum separation distance between the reader and the NFC communication logic and a second antenna coil for operating with a second minimum separation distance between the reader and the NFC communication logic.

In a further embodiment of the invention, the machine-readable tag includes combined RFID and NFC functionality where both RFID listening functions and NFC read-write functions are to be available in the same NFC communication logic, where different RFID listening applications require different minimum separation distances between the reader and the NFC communication logic. The NFC communication logic chip is selectively connected to at least three antenna coils, the first antenna coil for operating with a first minimum separation distance between the reader and the NFC communication logic, the second antenna coil for operating with a second minimum separation distance between the reader and the NFC communication logic, and the third antenna coil for reading and writing. In a further embodiment of the invention, matching circuits are included with the respective antenna coils to tune the resonant frequency of the RLC oscillator circuit for each antenna coil in the NFC communication logic.

DESCRIPTION OF DRAWINGS

The invention will be further understood from the following detailed description of a preferred embodiment, taken in conjunction with appended drawings, in which.

DESCRIPTION OF PREFERRED EMBODIMENT

While the invention has been described in preferred embodiments, various changes can be made therein without departing from the spirit and scope of the invention, as described in the appended claims.

The present invention may be employed in enhancing or extending the communication ability of a short-range machine-readable tag. While RFID tags will be discussed throughout the specification, the same system may be applied to any short-range machine-readable communication technology employing similar communication characteristics.

Figure 1:
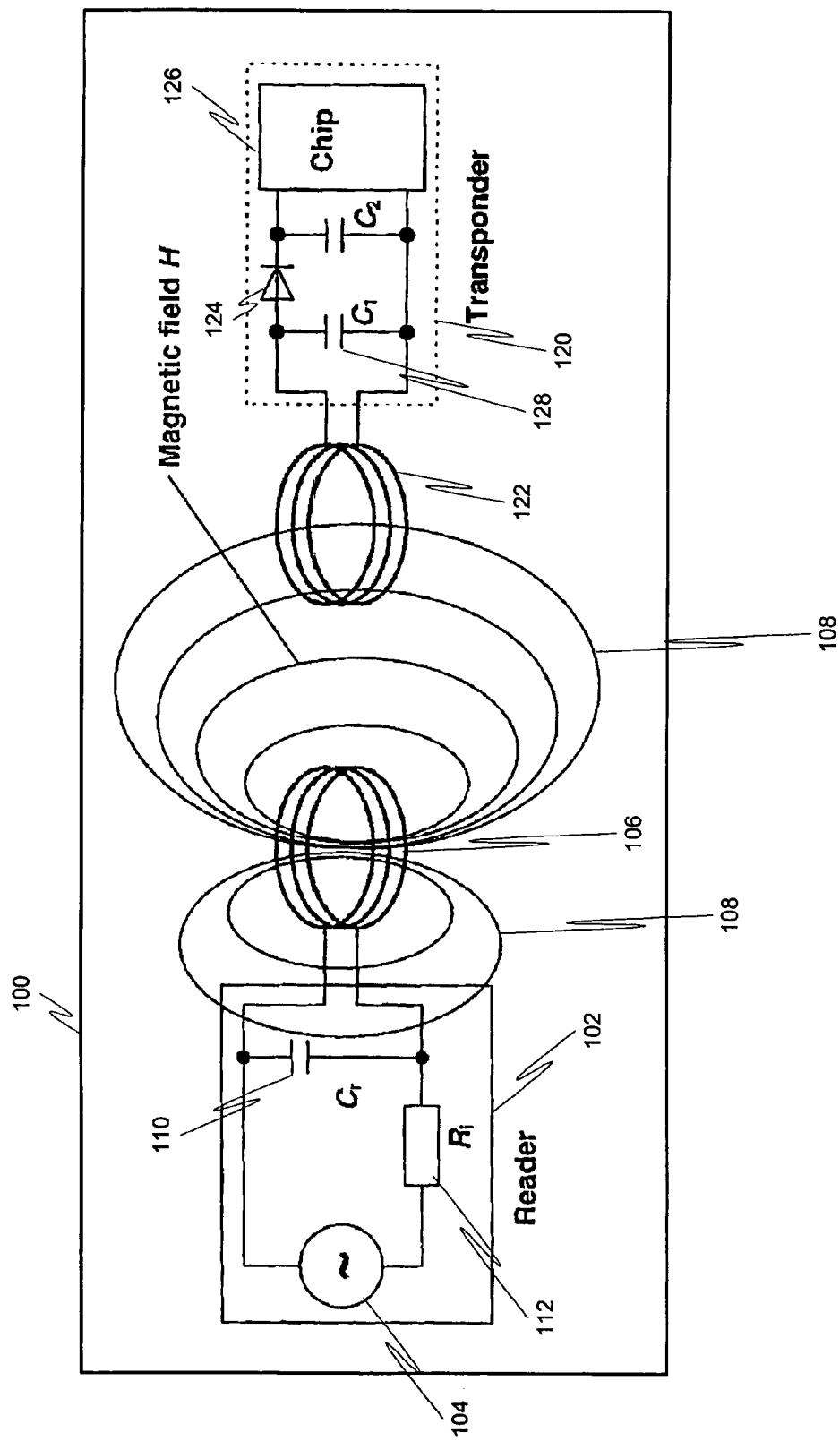
FIG. 1 is an exemplary diagram of a rudimentary RFID reader and transponder.

FIG. 1 depicts a baseline RFID reader/transponder system 100, which includes the reader 102 (also known as a scanner) and the transponder 120. The reader 102 includes an AC power source 104 connected to the reader's antenna coil 106, which generates a strong, high frequency electromagnetic field in the area around the reader's antenna coil 106. The strength of the field depends on the power source and the size and number of turns in the coil. The capacitor 110 connected in parallel with the reader's antenna coil 106 and the internal resistance 112 form an RLC oscillator that establishes a resonant circuit with a frequency that corresponds to the transmission frequency of the reader 102. Because the wavelength of the frequency used is several times greater than the close proximity distance between the reader's antenna coil 106 and the transponder's antenna coil 122, the electromagnetic field can be treated as an alternating magnetic field 108. This region of close proximity is referred to as the near field region. The two antennas are linked by their mutual inductance, as in a transformer, with the primary coil being the reader's antenna coil 106 and the secondary coil being the transponder's antenna coil 122. The alternating magnetic field 108 penetrates the transponder's antenna coil 122 when it is in the near field region, inducing an alternating current in the transponder's antenna coil 122. The alternating current is rectified by the diode 124 and serves as the power supply to the RFID microchip 126, which stores the data for the transponder 120.

The transponder's antenna coil 122, the capacitor 128, and the load resistance of the RFID microchip 126 form an RLC oscillator establishing a resonant circuit tuned to the transmission frequency of the reader 102. When the resonant frequency of the transponder 120 corresponds to the transmission frequency of the reader 102, this draws energy from the magnetic field 108. This additional power consumption manifests itself in the reader 102 as a voltage drop across the internal resistance 112 in the reader 102 through the supply current to the reader's antenna coil 106. The RFID microchip 126 represents a variable load resistance to the transponder's antenna coil 122. If the RFID microchip 126 switches its variable load resistance on and off, this changes the resonant frequency of the transponder 120 so that it does not correspond to the transmission frequency of the reader 102, which is then detected as a voltage change across the internal resistance 112 in the reader 102. In this manner, the RFID microchip 126 can use its stored data to modulate the load resistance on the transponder's antenna coil 122 and transfer its stored data from the transponder 120 to the reader 102. This describes the basic, one-way "listening" function of an RFID system, such as would be used in an identity card to store the user's ID. More sophisticated RFID systems may use Near Field Communication (NFC) technology for two-way "read-write" communications. NFC is based on RFID technology and enables wireless two-way communication between two devices over a short range measured in centimeters. Alternate embodiments of the invention are discussed below that include NFC technology.

Figure 2:
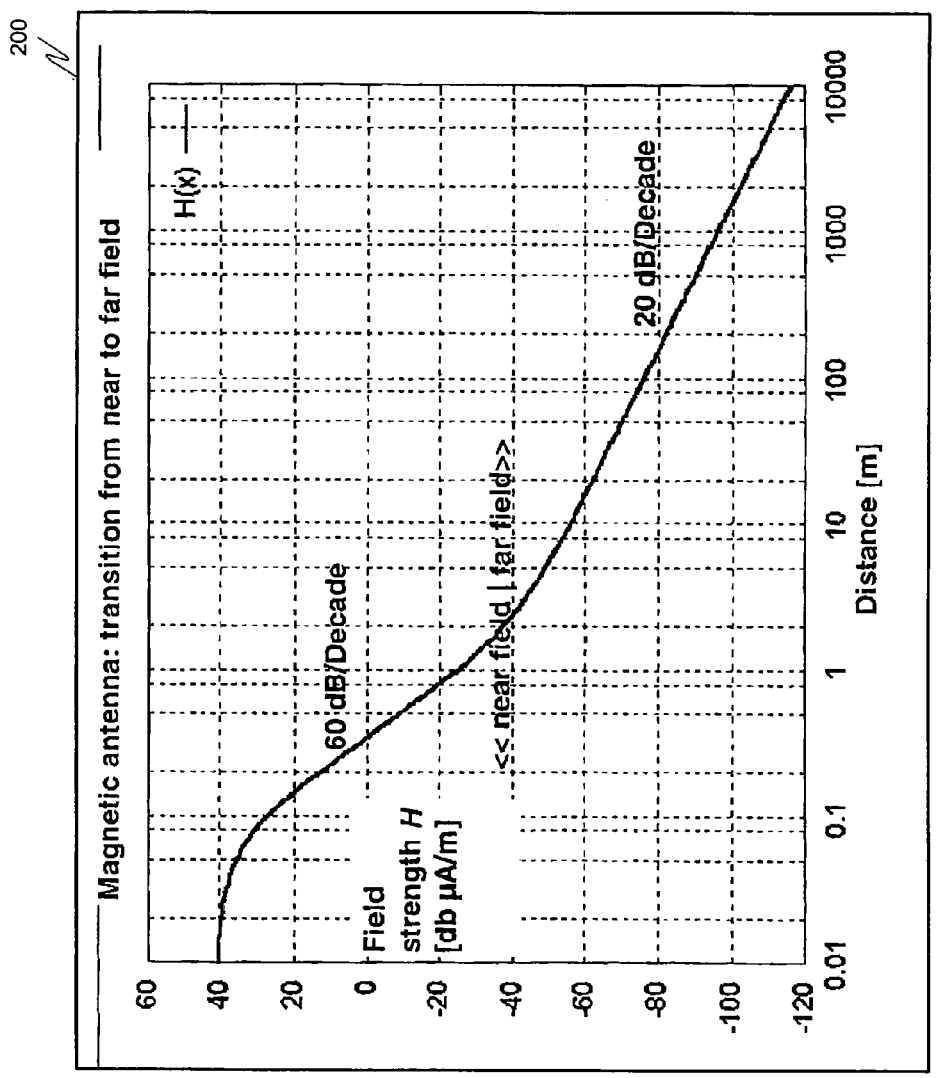
FIG. 2 is a chart demonstrating the field strength of a magnetic antenna system operating at 13.56 MHz over distance.

FIG. 2 includes a chart that demonstrates magnetic field strength at various distances at a frequency of 13.56 MHz. The electromagnetic coupling between a reader and transponder must occur while the magnetic field is still in proximity to the reader antenna. This condition is called "near field". Once the electromagnetic field emanates from the reader antenna into space, the electromagnetic waves are considered to be "far field". In order to have an inductive coupling, wherein the reader powers the transponder and the transponder, in turn, communicates data by inducing current changes in the reader antenna, the coils must be within the near field region. This means that the system can only operate up to the near field maximum. Per FIG. 2, at this frequency the near field maximum is about 3.5 m. This means that the system has a maximum operation range of 3.5 m. It is important to note that RFID systems operating at a distance over 1 m are considered to be long range systems. 90-95% of all RFID equipment purchased is used in inductively coupled systems that typically operate at a maximum range of 1. However, even this distance may be substantially shortened because the induced power transmitted via inductive coupling can be very low relative to the reader power and the size of the antennas. For example, a portable reader running off of battery power, such as a compact reader contained in a WCD, may only have an effective reading range of 2-5 cm under normal conditions.

The short effective transmission range of RFID and NFC communication technologies, such as previously described, limit possible applications. Low power readers must be almost on top of a transponder to perform reliable communication, which would not be conducive to a commercial setting with a large number of targeted recipients. If, for example, an advertiser or business owner wants to transfer information to customers in proximity to a poster or billboard, the information must begin downloading as soon as possible, given that the targeted reading device may only pause momentarily in front of the structure containing the tag. One way to facilitate complete downloads is to start the download as soon as possible by extending the effective transmission range of the machine readable tag.

Figure 3:
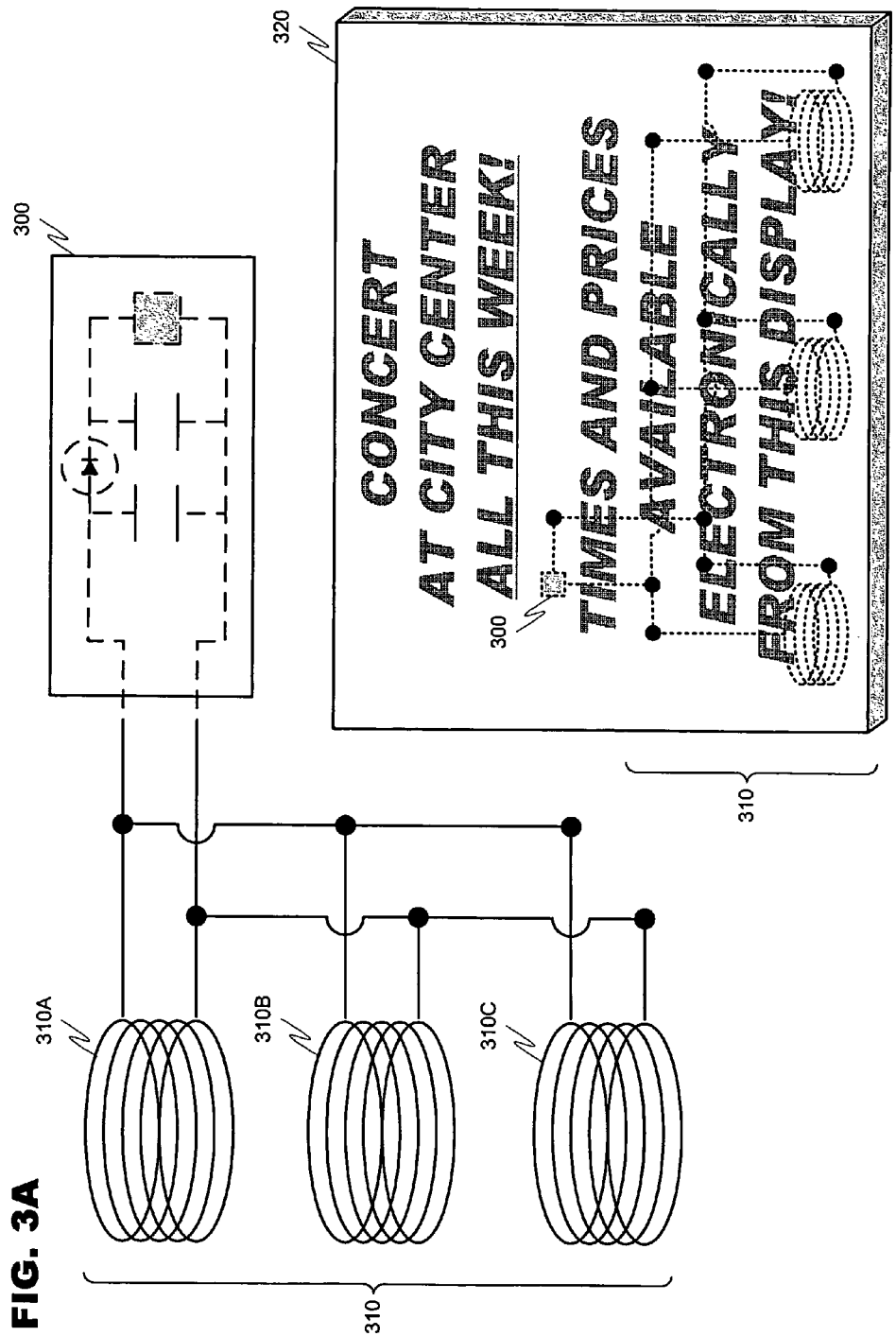
FIG. 3A is a circuit diagram of an exemplary extended antenna system for a machine-readable tag.
FIG. 3B is an exemplary application of the system of FIG. 3A.

FIG. 3A depicts the functional layout of a transponder system including an extended antenna. Extended antenna 310 includes three coils 310A-C. These coils are connected to transponder 300 which includes a rectifier and control chip. If an RFID reader were to approach any of these coils, the transponder could form an inductive link and transfer data back to the reader. However, as explained below, this system is not effective due to losses or potential overages from multiple simultaneous reading.

FIG. 3B includes an application of the system of FIG. 3A. Here sign or billboard 320 includes a transponder tag 300 and an extended antenna 310. The extended antenna includes three antenna coils extending along the bottom of the sign. While this construct provides more RFID coverage along the length of the sign, it is not without its drawbacks. A single reader may not able to induce a strong enough current in a single coil to power the transponder due to the increased overall length of the antenna. On the other hand, the system does not account for multiple reader devices concurrently in proximity of the plurality of coils. A risk exists for the transponder system to become overloaded if too many devices are reading the various antennas simultaneously. There is also a physical limitation rendering the system inflexible. The extended antenna may be integrated into the display in which a poster or billboard is housed (e.g., the extended antenna coils may be a part of the frame of a display case). The changing of a poster or billboard, either manually or automatically, would require some sort of system to sever the physical linkage between the specific transponder pertaining to the poster and the extended antenna.

Figure 4:
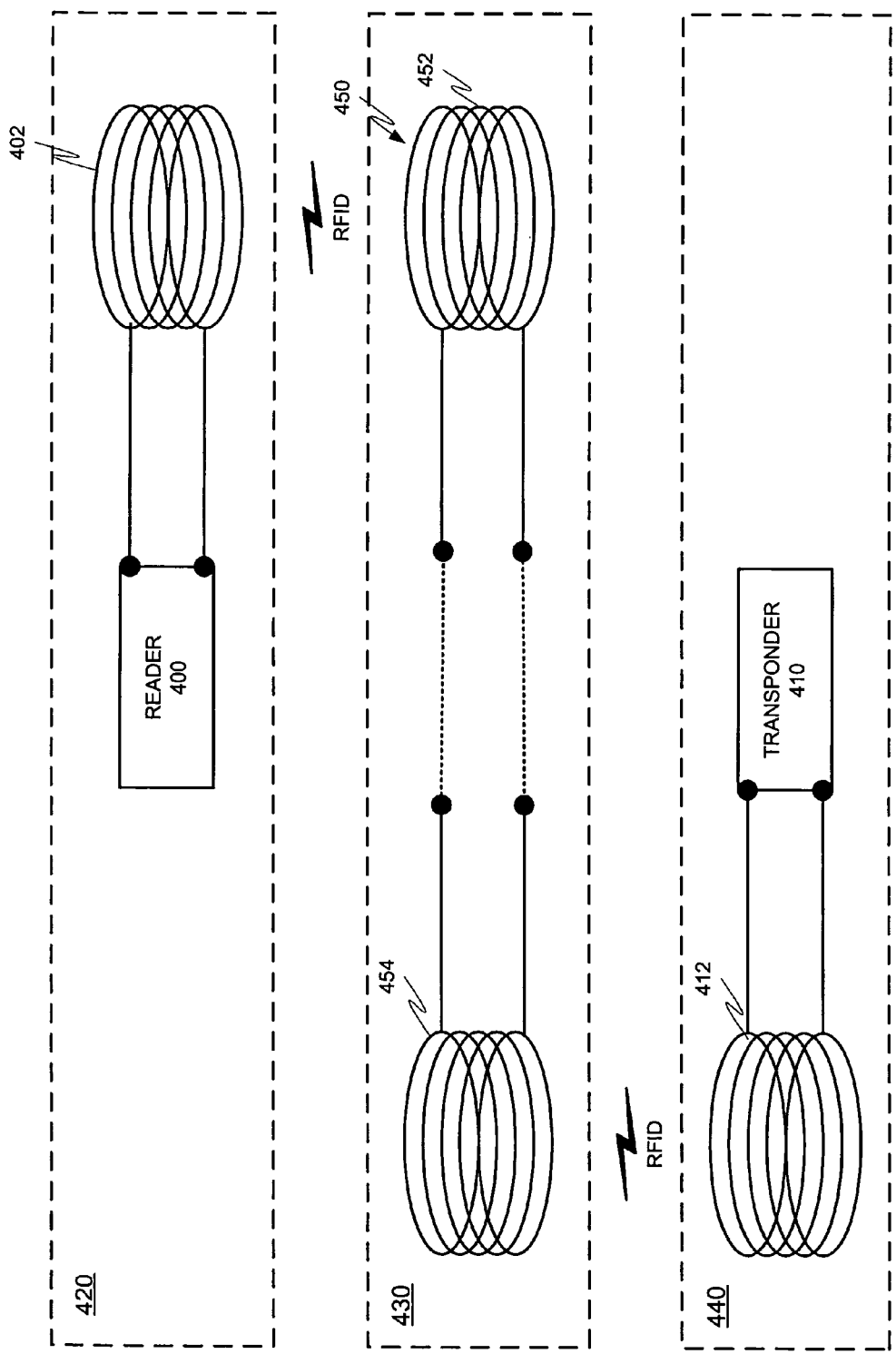
FIG. 4 is a diagram of an extended antenna system in accordance with at least one embodiment of the present invention.

FIG. 4 demonstrates a wireless method of coupling a mobile reading device 400 located outside a structure to a RFID or NFC transponder 410 positioned inside the structure using a wireless extension antenna 450, in accordance with at least one embodiment of the present invention. Reader 400 resides in region 420 and travels in a direction substantially parallel to the length of the extension antenna 450. Region 420 exists outside a structure (e.g., in proximity to a display box for a poster or billboard). The reader 400 includes the reader's antenna coil 402, which generates a strong, high frequency electromagnetic field in the area around the reader's antenna coil 402. Wireless extension antenna 450 resides within the structure itself (region 430). Wireless extension antenna 450 includes a group of antenna coils 452, 454, etc. which are mutually connected in series so that a current induced in any one of the coils 452, 454, etc. will pass through the other coils in the group. Because the wavelength of the transmission frequency from reader 400 is several times greater than the close proximity distance between the reader's antenna coil 402 and coil 452 of extension antenna 450, the electromagnetic field can be treated as an alternating magnetic field in the near field region. The two antenna coils 402 and 452 are linked by their mutual inductance, as in a transformer, with the primary coil being the reader's antenna coil 402 and the secondary coil being the coil 452 of extension antenna 450. The alternating magnetic field from the reader's antenna coil 402 penetrates the coil 452 of extension antenna 450 when it is in the near field region, inducing an alternating current in the coil 452 of extension antenna 450. Antenna coils 452 and 454 of extension antenna 450 are mutually connected in series so that a current induced in the coil 452 will pass through the coil 454 of extension antenna 450. At the opposite end of the extension antenna 450, the coil 454 of extension antenna 450 and the transponder's antenna coil 412 are linked by their mutual inductance, as in a transformer, with the primary coil being the coil 454 of extension antenna 450 and the secondary coil being the transponder's antenna coil 412. For instance, in the previous structural example the extension antenna 450 might be built into the frame of a display case or may consist of a transparent conductive coating applied to the surface of the display glass, etc. The transponder 410 is in region 440, which may be an area within the structure such as adhered to a poster, in a special receptacle or holder, etc. The extension antenna 450 bridges the space from region 420 to 440 by receiving the reader 400's electromagnetic field at one end in coil 452 and transferring the induced current to the series-connected coil 454 at the opposite end so that the transponder coil 412 may receive the energy. In this way, the reception distance of the transponder coil 412 is extended without the need to mechanically connect the transponder tag to the extension antenna 450. Many coils may be connected in the group of antenna coils 452, 454, etc. along the length of the extension antenna 450 so as to be mutually connected in series to enable a current induced in any one of the coils 452, 454, etc. to pass through the other coils in the group, so that a transponder coil 412 may receive the energy. Thus, as the mobile reader 400 travels in a direction substantially parallel to the length of the extension antenna 450, each consecutive antenna coil 452, 454, etc. in the group will be linked by its mutual inductance, as in a transformer, to the reader's antenna coil 402, so that a transponder coil 412 may receive the energy.

Figure 5:
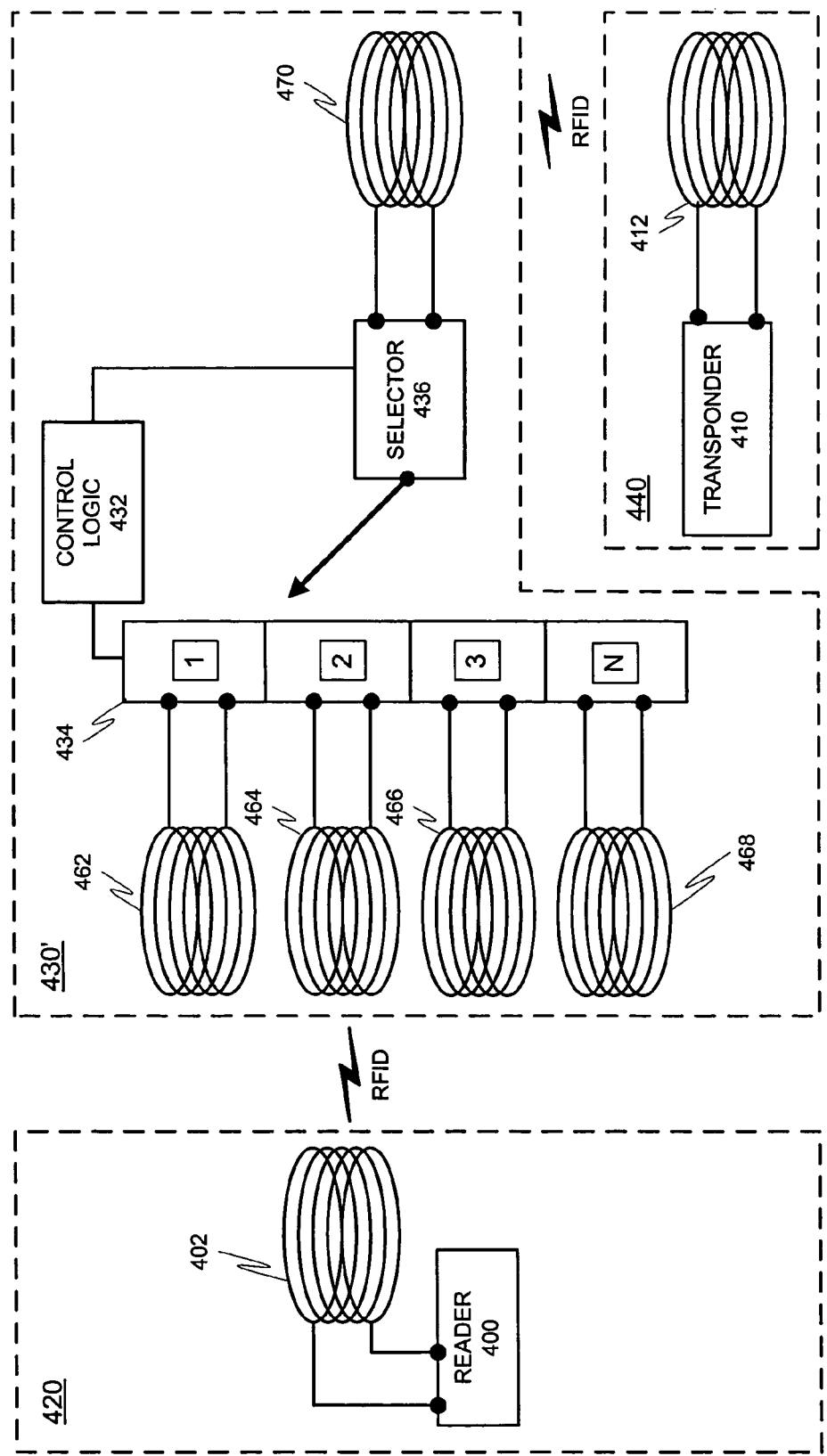
FIG. 5 is a functional diagram of an extended antennae system including control logic in accordance with at least one embodiment of the present invention.

FIG. 5 draws on the previously discussed principles to yield another embodiment of the present invention. Here reader 400 in region 420 and RFID or NFC transponder 410 in region 440 are separated by region 430 containing an extension antenna system 430'. In FIG. 5, the extension antenna system 430' includes control logic 432 to employed to manage multiple extension antenna coils 462, 464, 466, and 468. Control logic 432 may be implemented in monolithic hardware components, programmable components, or a combination of memory and processing components acting to implement a program code. The control logic 432's inputs are connected to field sensors 434 which may be integrated with each extension antenna coil 462, 464, 466, and 468, may be integrated into the control logic, or may be stand alone sensors connected by a bus. The sensors 434 detect the current induced in each respective extension antenna coil 462, 464, 466, or 468 and alert control logic 432 when the electromagnetic field from reader 400 is in close proximity to a particular extension antenna coil. As the antenna coil 402 of reader 400 travels past one of the extension antenna coils 462, 464, 466, and 468, for example coil 462, the reader's antenna coil 402 and extension antenna coil 462 are linked by their mutual inductance, as in a transformer, with the primary coil being the reader's antenna coil 402 and the secondary coil being the extension antenna coil 462. The sensor 434 connected to extension antenna coil 462 detects the current induced in extension antenna coil 462 and, if a threshold value is exceeded, it signals the control logic 432 to the presence of a magnetic field in proximity to extension antenna coil 462. The threshold level may be related to a field level, a voltage change, an induced current, etc. An antenna coil 462, 464, 466, or 468 in this state is considered an "active" extension antenna coil. Control logic 432 interprets this information and in turn controls selector 436 to connect its input to the active antenna coil and conduct the induced current from the active antenna coil to the output coil 470. The output coil 470 and the transponder's antenna coil 412 are linked by their mutual inductance, as in a transformer, with the primary coil being the output coil 470 and the secondary coil being the transponder's antenna coil 412. The extension antenna system 430' bridges the space from region 420 to 440 by receiving the reader 400's electromagnetic field at one of the extension antenna coils 462, 464, 466, and 468 and transferring the induced current to the output coil 470 so that the transponder coil 412 may receive the energy. In this way, the reception distance of the transponder coil 412 is extended without the need to mechanically connect the transponder tag to the extension antenna system 430'. Also, as the mobile reader 400 travels past the extension antenna system 430', each consecutive antenna coil 462, 464, 466, and 468 will be consecutively connected to the output coil 470, so that the transponder coil 412 may receive the energy.

Figure 6:
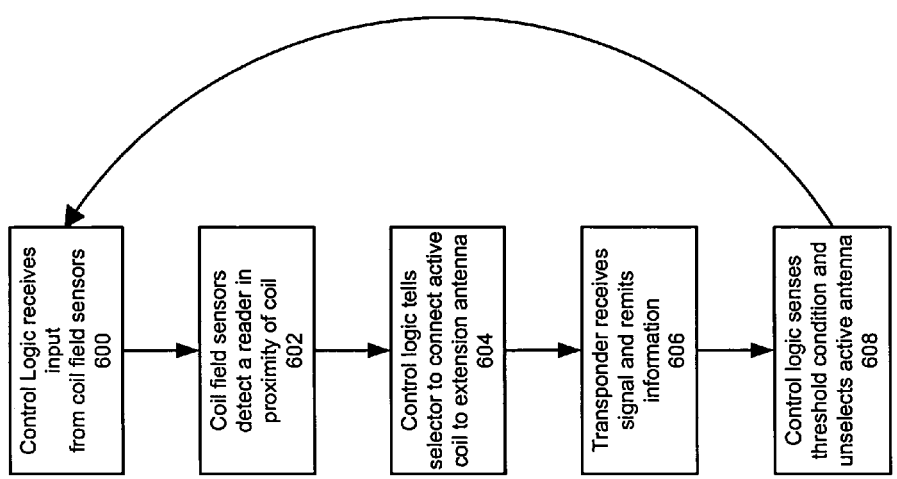
FIG. 6 is a flow chart diagramming a communication sequence in accordance with at least one embodiment of the present invention.

The process of at least one embodiment of the present invention is explained in FIG. 6. In step 600, control logic 432 receives input from antenna field sensors 434. These sensors advise the control logic 432 when an electromagnetic field, and hence a reading device, is in proximity to a coil (step 602). The control logic 432 may use a variety of algorithms to determine which coil to activate (step 604). For example, if multiple coil sensors become active due to multiple reading devices being in proximity of the system, the control logic 432 may queue the active antennas in order to dispatch the reading devices in a certain order. Once an active extension antenna is selected, the reading signal is relayed to a coupling antenna in step 606, which induces a voltage in the antenna for transponder tag 410. Information included on a microchip in the tag is then relayed back to the reader via inductive coupling. The system may then disconnect the active extension antenna (step 608) and activate another extension antenna or resume reading for additional active antennas based on a multitude of threshold conditions. These conditions may include a signal from the transponder, the lack of an electromagnetic field induced in the selected active antenna, the presence of an electromagnetic field at another extension antenna, duration, etc. At this point the system returns to step 600 where it waits for the presence of an electromagnetic field at one of the extension antennas.

Figure 7:
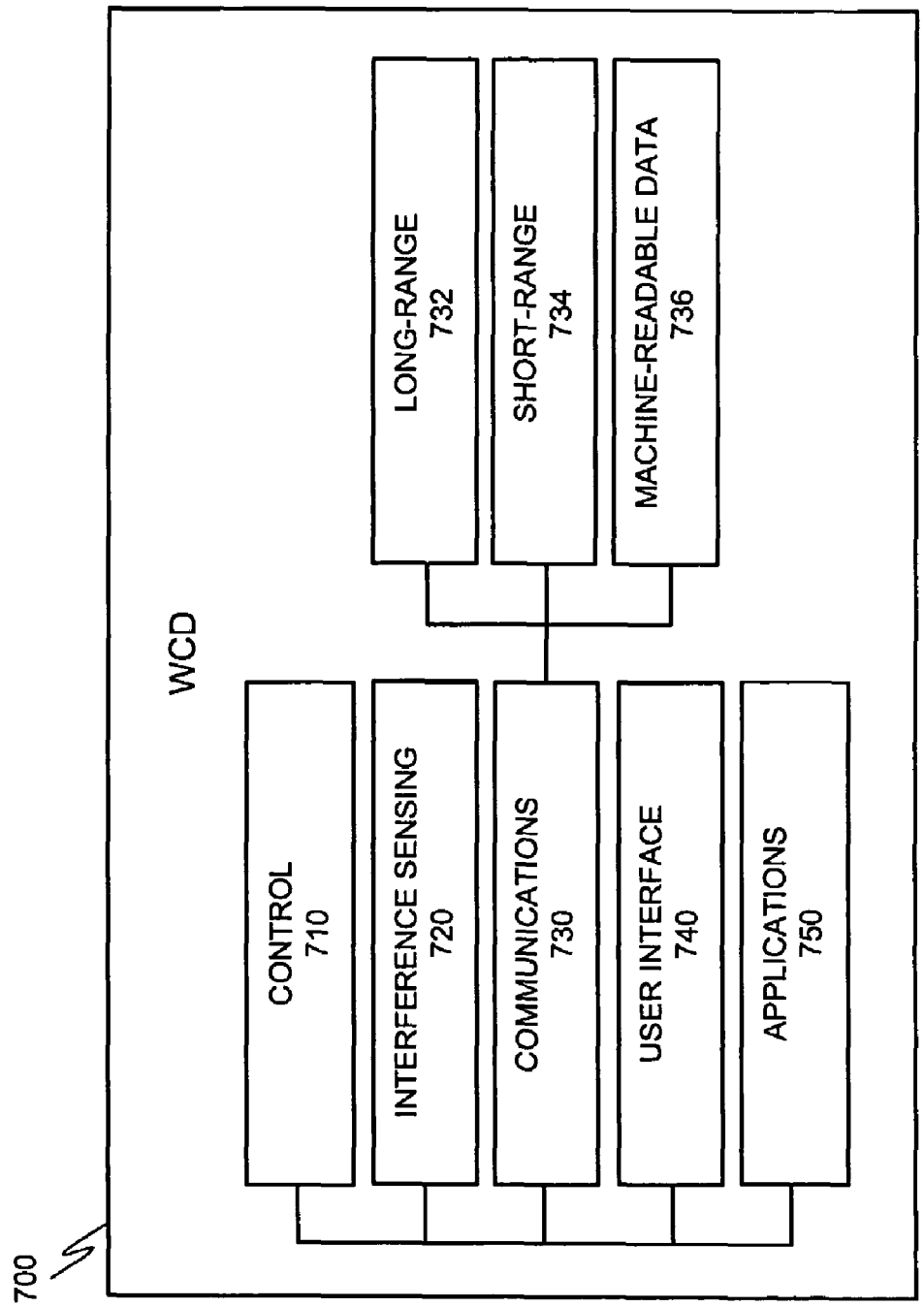
FIG. 7 in a modular diagram of an exemplary wireless communication device that may be employed with at least one embodiment of the present invention.

FIG. 7 discloses an exemplary modular layout for a wireless communication device usable with the instant invention. WCD 700 is broken down into modules representing the functional aspects of the device. These functions may be performed by various combinations of software and/or hardware components discussed below.

Control module 710 regulates the operation of the device. Inputs may be received from various other modules included within WCD 700. For example, interference sensing module 720 may use various techniques known in the art to sense sources of environmental interference within the effective transmission range of the wireless communication device. Control module 710 interprets these data inputs and in response may issue control commands to the other modules in WCD 700.

Communications module 730 incorporates all of the communications aspects of WCD 700. As shown in FIG. 7, communications module 730 includes for example long-range communications module 732, short-range communications module 734 and machine-readable data module 736. Communications module 730 utilizes at least these sub-modules to receive a multitude of different types of communication from both local and long distance sources, and to transmit data to recipient devices within the broadcast range of WCD 700. Communications module 730 may be triggered by control module 710 or by control resources local to the module responding to sensed messages, environmental influences and/or other devices in proximity to WCD 700.

User interface module 740 includes visual, audible and tactile elements which allow the user of WCD 100 to receive data from, and enter data into, the device. The data entered by the user may be interpreted by control module 710 to affect the behavior of WCD 700. User inputted data may also be transmitted by communications module 730 to other devices within effective transmission range. Other devices in transmission range may also send information to WCD 700 via communications module 730, and control module 710 may cause this information to be transferred to user interface module 740 for presentment to the user.

Applications module 750 incorporates all other hardware and/or software applications on WCD 700. These applications may include sensors, interfaces, utilities, interpreters, data applications, etc., and may be invoked by control module 710 to read information provided by the various modules and in turn supply information to requesting modules in WCD 700.

Figure 8:
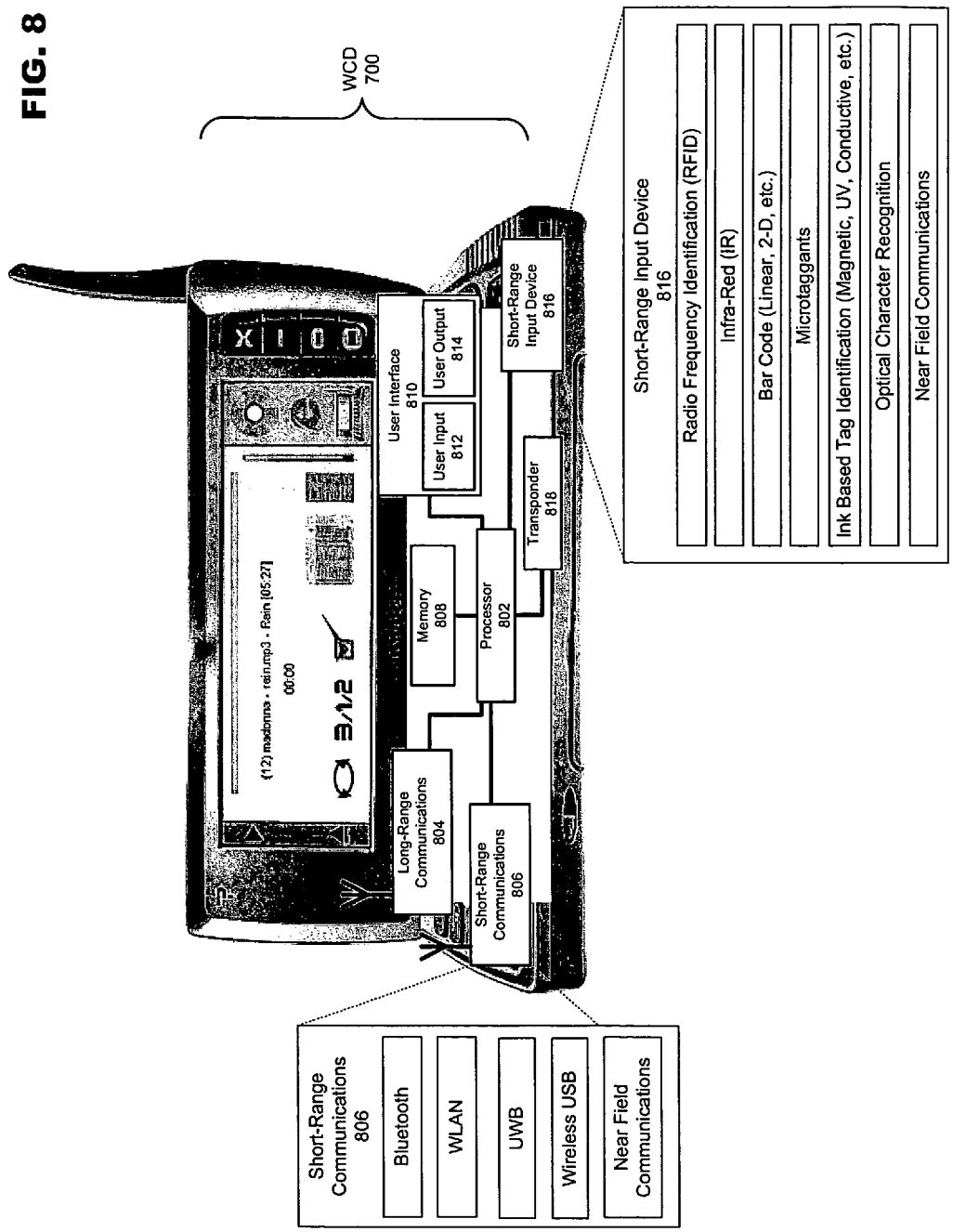
FIG. 8 is a functional diagram of an exemplary wireless communication device that may be employed with at least one embodiment of the present invention.

FIG. 8 discloses an exemplary structural layout of WCD 700 according to an embodiment of the present invention that may be used to implement the functionality of the modular system previously described. Processor 802 controls overall device operation. As shown in FIG. 8, processor 802 is coupled to communications sections 804, 806 and 816. Processor 802 may be implemented with one or more microprocessors that are each capable of executing software instructions stored in memory 808.

Memory 808 may include random access memory (RAM), read only memory (ROM), and/or flash memory, and stores information in the form of data and software components (also referred to herein as modules). The data stored by memory 808 may be associated with particular software components. In addition, this data may be associated with databases, such as a bookmark database or a business database for scheduling, email, etc.

The software components stored by memory 808 include instructions that can be executed by processor 802. Various types of software components may be stored in memory 808. For instance, memory 808 may store software components that control the operation of communication sections 804, 806 and 816. Memory 808 may also store software components including a firewall, a service guide manager, a bookmark database, user interface manager, and any communications utilities modules required to support WCD 700.

Long-range communications 804 performs functions related to the exchange of information across large coverage area networks (such as cellular networks) via an antenna. Therefore, long-range communications 804 may operate to establish data communications sessions, such as General Packet Radio Service (GPRS) sessions and/or Universal Mobile Telecommunications System (UMTS) sessions. Also, long-range communications 804 may operate to transmit and receive messages, such as short messaging service (SMS) messages and/or multimedia messaging service (MMS) messages.

Short-range communications 806 is responsible for functions involving the exchange of information across short-range wireless networks. As described above and depicted in FIG. 8, examples of such short-range communications 806 are not limited to Bluetooth™, WLAN, UWB, Wireless USB, and Near Field Communications (NFC) connections. Accordingly, short-range communications 806 performs functions related to the establishment of short-range connections, as well as processing related to the transmission and reception of information via such connections.

Short-range input device 816, also depicted in FIG. 8, may provide functionality related to the short-range reading of machine-readable data. For example, processor 802 may control short-range input device 816 to generate RF signals for activating an RFID transponder, and may in turn control the reception of signals from an RFID transponder. Other short-range reading methods for reading machine-readable data that may be supported by the short-range input device 816 are not limited to IR communications, linear and 2-D bar code readers (including processes related to interpreting UPC labels), Near Field Communications (NFC), and optical character recognition devices for reading magnetic, UV, conductive or other types of coded data that may be provided in a tag using suitable ink. In order for the short-range input device 816 to read the aforementioned types of machine-readable data, the input device may include optical detectors, magnetic detectors, CCDs or other sensors known in the art for interpreting machine-readable information.

Further shown in FIG. 8, user interface 810 is also coupled to processor 802. User interface 810 facilitates the exchange of information with a user. FIG. 8 shows that user interface 810 includes a user input 812 and a user output 814. User input 810 may include one or more components that allow a user to input information. Examples of such components include keypads, touch screens, and microphones. User output 814 allows a user to receive information from the device. Thus, user output portion 814 may include various components, such as a display, Light emitting diodes (LED), tactile emitters and one or more audio speakers. Exemplary displays include liquid crystal displays (LCDs), and other video displays.

WCD 700 may also include a transponder 818. This is essentially a passive device which may be programmed by processor 802 with information to be delivered in response to a read from an outside source. For example, an RFID reader mounted in a entryway may continuously emit radio frequency waves. When a person with a device containing transponder 818 walks through the door, the transponder is energized and may respond with information identifying the device.

Hardware corresponding to communications sections 804, 806 and 816 provide for the transmission and reception of signals. Accordingly, these portions may include components (e.g., electronics) that perform functions, such as modulation, demodulation, amplification, and filtering. These portions may be locally controlled, or controlled by processor 802 in accordance with software communications components stored in memory 808.

The elements shown in FIG. 8 may be constituted and coupled according to various techniques in order to produce the functionality described in FIG. 7. One such technique involves coupling separate hardware components corresponding to processor 802, communications sections 804 and 806, memory 808, short-range input device 816, user interface 810, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 810 may interact with a communications utilities software component, also contained in memory 808, which provides for the establishment of service sessions using long-range communications 804 and/or short-range communications 806. The communications utilities component may include various routines that allow the reception of services from remote devices according to mediums, such as the Wireless Application Medium (WAP).

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

Figure 9:
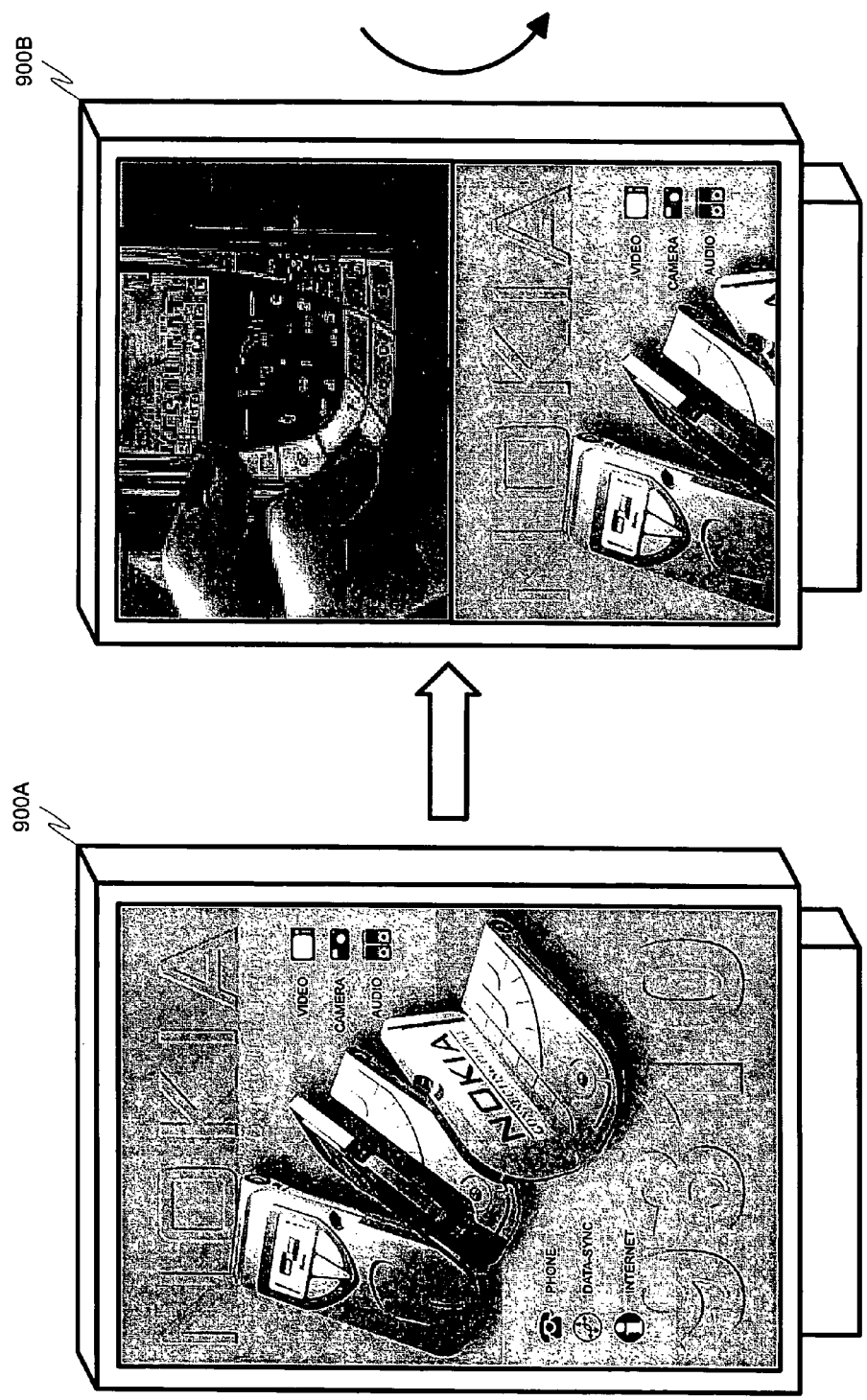
FIG. 9 is an exemplary scrolling sign or billboard that may be employed with at least one embodiment of present invention.

FIG. 9 discloses a display device usable in at least one embodiment of the instant invention. A scrolling sign or billboard device is disclosed at 900A. The device includes a display box with a transparent front for displaying signs or posters containing an indicia of an informative nature (e.g., commercial, educational, instructional, etc.) In an improvement over traditional display devices, a plurality of posters may be included on a roller mechanism inside the display box. The device may then include control logic to periodically change from one poster to another, maximizing the use of the display box for different advertisers. The scrolling sign or billboard is shown at 900B during a change from one poster to another.

Figure 10:
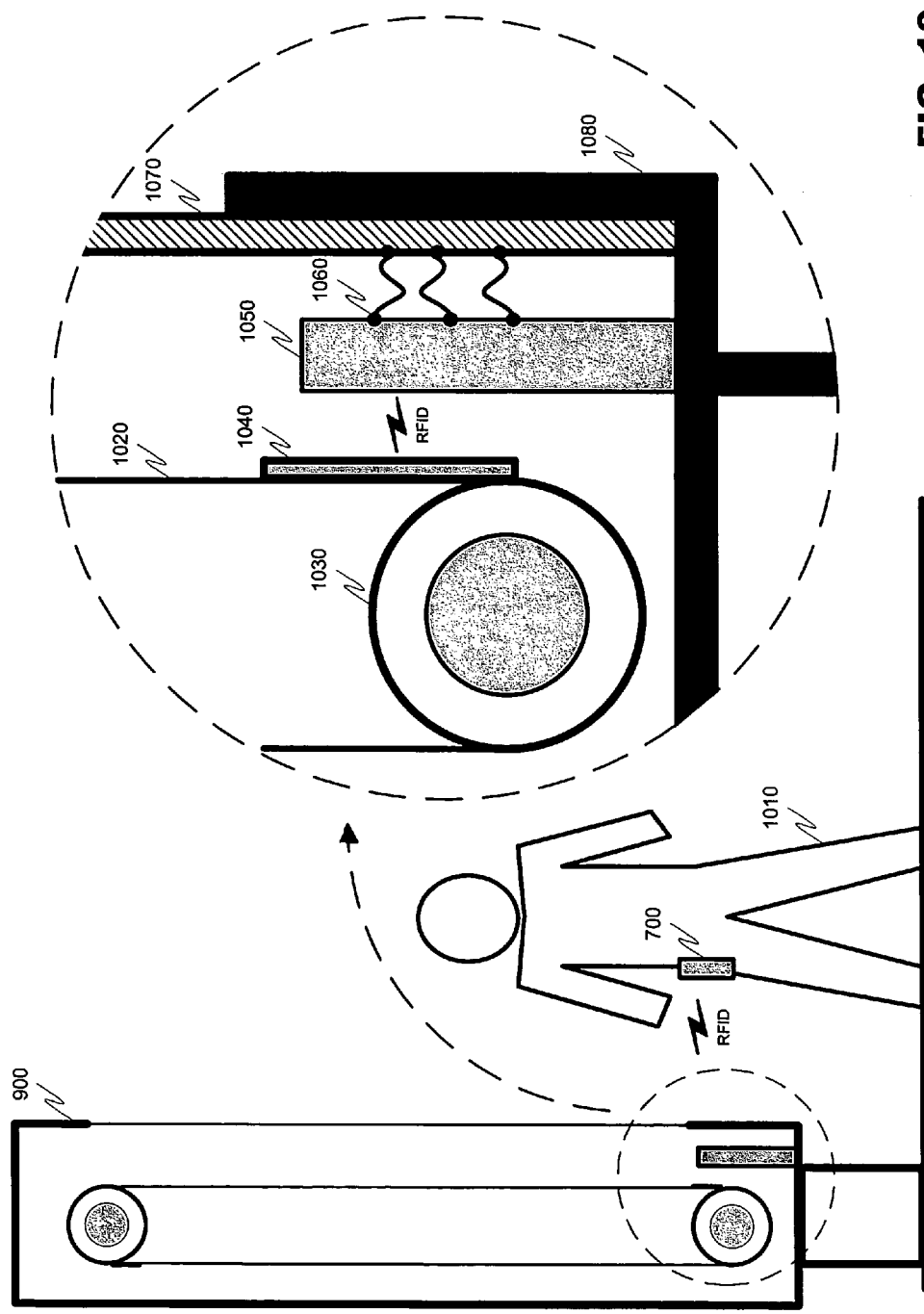
FIG. 10 includes a close-up section of the sign of FIG. 8 demonstrating the application of at least one embodiment of the present invention.

A close-up of at least one implementation of the WCD 700 disclosed in FIG. 7-8 interacting with the scrolling sign or billboard of FIG. 9 is now disclosed in FIG. 10. Sign 900 is shown from a side view as a user 1010 passes in front of it bearing WCD 700. In at least one embodiment of the invention, the system embedded in sign 900 allows information to be transferred to the WCD 700 automatically through RFID communication. This embodiment of the invention is shown in detail inside of the dotted circle also in this figure. Posters 1020 are contained on roller system 1030. After some threshold is reached (e.g. periodic, sensed motion, etc.) the control system of sign 900 moves the rollers to display another poster contained in the sign. The number of posters contained in a sign 900 may vary depending on the mechanism of the particular sign. Each poster 1020 may contain a machine-readable tag 1040 adhered to the surface of the poster. In the embodiment shown in FIG. 10, the tag is an RFID tag. Tag 1040 is located proximate to antenna controller 1050 when a poster is being displayed in sign 900. Antenna controller 1050 may include the previously discussed control logic 432, field sensors 434, selector 436 and a coil for inductively coupling to the tag 1040. The antenna controller 1050 is connected to various extension antennas embedded in sign 900 through conductors 1060. These conductors may be wires, traces, buses, etc. which connect the antenna controller 1050 to various antenna coils embedded in transparent material 1070 or housing 1080.

The system of FIG. 10 provides a flexible solution for delivering desired data to information consumers. When sign 900 moves a new poster into place for display, the tag 1040 is moved proximate to antenna controller 1050. A user 1010 then may come into range of sign 900 to observe the poster 1020. The poster 1020 may indicate that electronic information is available, but indication is not required. In at least one embodiment, the user may then hold their WCD 700 up to the sign and activate a read function pertaining to the machine-readable data. Alternatively, WCD 700 may continuously read for machine-readable data and may also include a filter or firewall to automatically exclude certain types of information. In the case of RFID, electromagnetic waves contact an antenna embedded in transparent material 1070 or housing 1080 of the sign 900. Antenna controller 1050 includes control logic 432 which reacts to an indication from a field sensor 434 and sets the selector 436 to select the active antenna. The antenna coil contained in antenna controller 1050 then inductively couples to the tag 1040 which energizes a chip contained within the tag (not pictured). The chip may then impart information contained on the chip back through the antenna system to the reading device in WCD 700. The information may contain a website address (URL), an email address, a SMS or MMS address, a telephone number, etc. allowing the user to get more information on the desired subject at a later time. Antenna controller 1050, when some threshold is attained, may then deactivate the currently active antenna and activate another antenna, or reset the system in order to prepare for the next sensed reading device.

Figure 11:
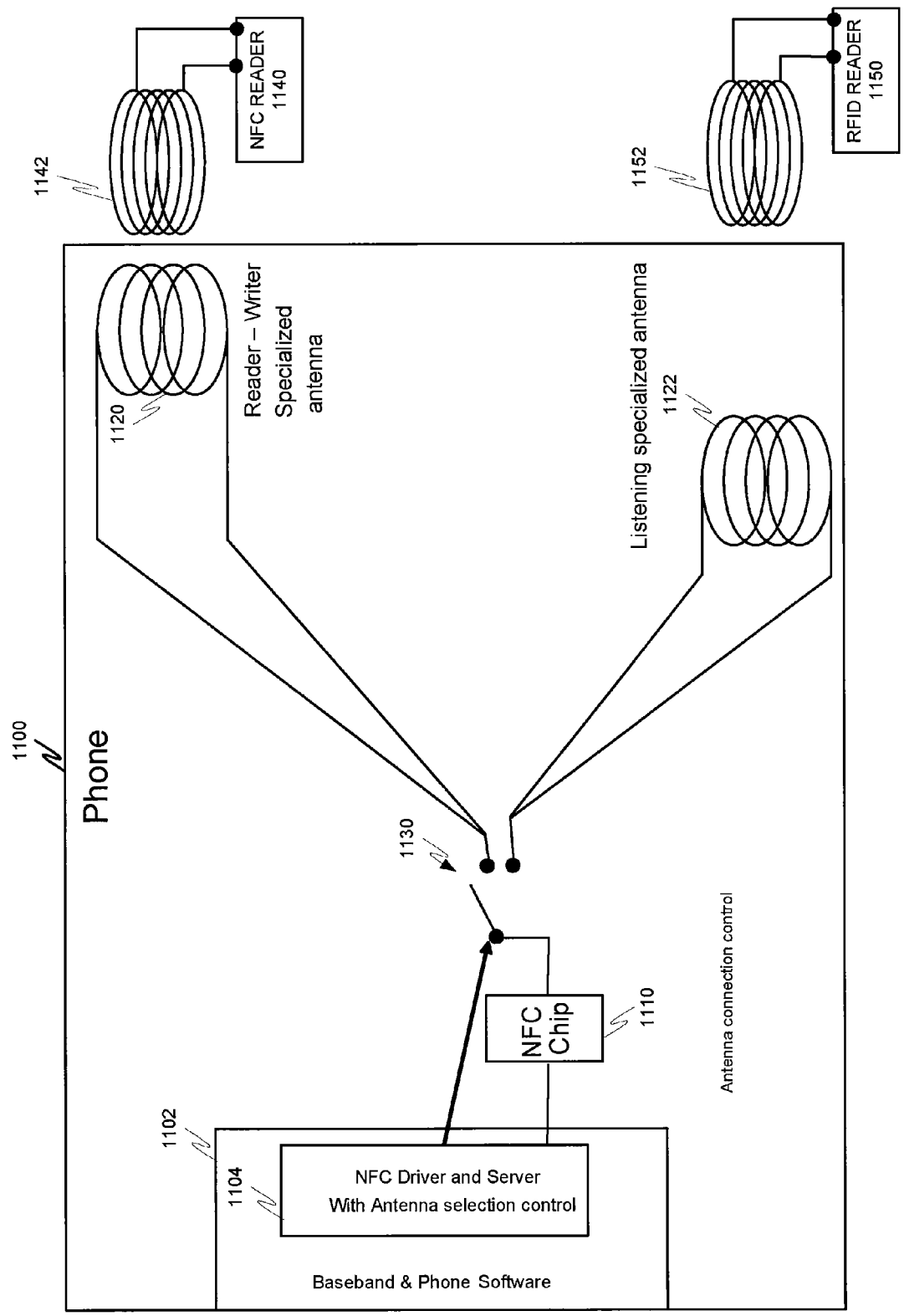
FIG. 11 is a circuit diagram of a wireless phone that includes a near field communications (NFC) chip selectively connected to two antenna coils, one for reading and writing and the other for listening.

FIG. 11 is a circuit diagram of a further embodiment of the invention, wherein the NFC communication logic circuit includes combined RFID and NFC functionality where both RFID listening functions and NFC read-write functions are to be available in the same NFC communication logic circuit. In the embodiment shown in FIG. 11, the NFC communication logic circuit is a near field communications (NFC) chip 1110 selectively connected to two antenna coils, one antenna coil 1120 for reading and writing and the other antenna coil 1122 for listening. For the NFC reader-writer function, the distance between the NFC reader antenna coil 1142 and the NFC communication logic's reader-writer antenna coil 1120 must be a short distance (e.g., less than two centimeters) or actual physical contact between the NFC reader antenna 1142 and the NFC communication logic antenna 1120. This requires that the reader-writer antenna 1120 be configured for optimum performance at short distances. For the RFID listening function, the distance between the RFID reader antenna coil 1152 and the NFC communication logic's listening antenna 1122 must be a longer distance of several centimeters. This requires that the listening antenna 1122 be configured for optimum performance at longer distances than that for the reader-writer antenna 1120.

Figure 14:
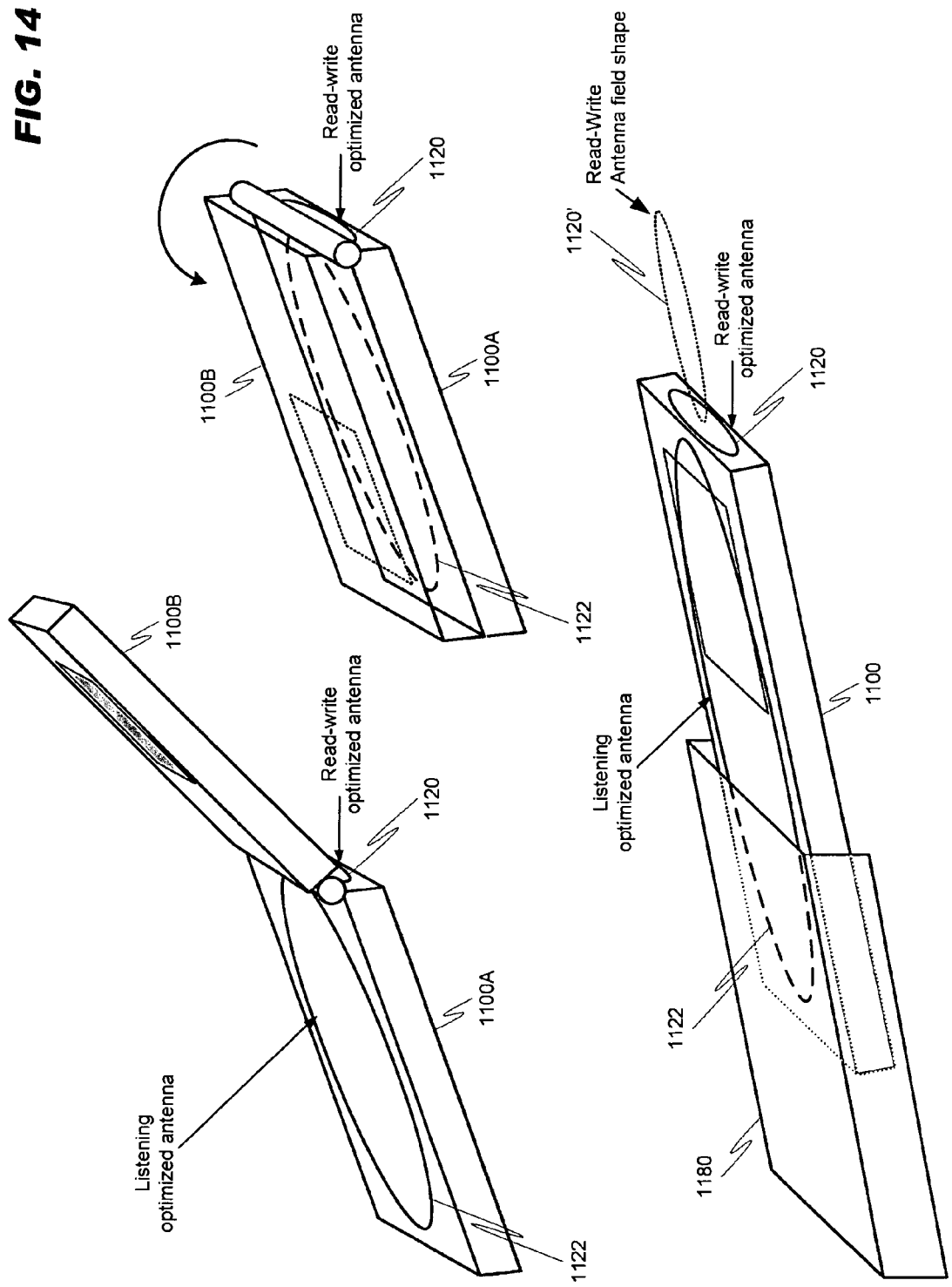
FIG. 14 is view of a wireless phone and the relative placement of two antennas, one for optimized listening and the other for optimized reading, to be used in near field communications (NFC).

In the embodiment shown in FIG. 11, the NFC chip 1110 and the two antenna coils 1120 and 1122 are integrated with a wireless telephone 1100, enabling touch-based interactions in consumer electronics, mobile devices, PCs, smart objects and for payment purposes. Reference to FIG. 14 shows example antenna positioning in the mobile phone 1100.

Figure 15:
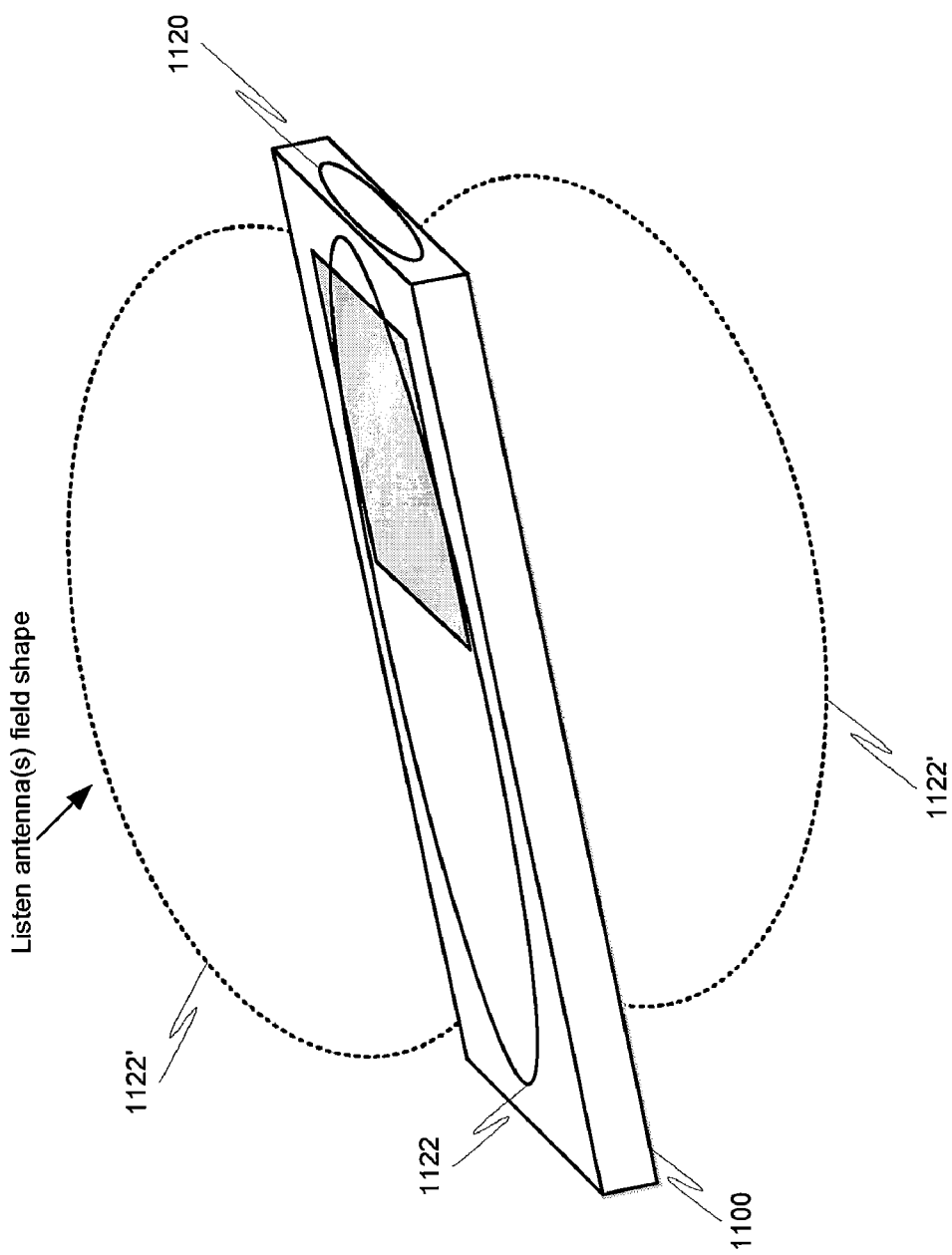
FIG. 15 is view of a wireless phone and the shape of the field for the optimized listening antenna, to be used in near field communications (NFC).

FIG. 14 shows the antenna field shape 1120' for the NFC communication logic's reader-writer antenna coil 1120. FIG. 15 shows the antenna field shape 1122' for the NFC communication logic's listening antenna 1122. The wireless telephone 1100 includes baseband and phone software 1102 to carry out telephone network communications functions and user interface phone functions. The NFC-enabled wireless telephone 1100 also includes NFC driver and server software 1104 to control the functions of the NFC chip 1110 and to control a selector 1130 to selectively connect the chip 1110 respectively to the two antenna coils 1120 and 1122. The selector 1130 operates under control of the NFC driver and server software 1104 to selectively connect the chip 1110 respectively to the two antenna coils 1120 and 1122. In an alternate embodiment, the NFC chip 1110, selector 1130, and the two antenna coils 1120 and 1122 can be part of a shell that snaps onto the outside of the wireless phone 1100 as an enveloping cover.

An example RFID listening function for the NFC-enabled wireless telephone 1100 would be a read-only user ID card application where the RFID reader 1150 merely reads the user's ID from the NFC communication logic. The selector 1130 operates under control of the NFC driver and server software 1104 to selectively connect the NFC chip 1110 to the listener antenna coil 1122 to perform the RFID listening function. The NFC chip 1110 operating in its RFID listener mode under the control of the NFC driver and server software 1104, uses its stored data to modulate the current through the NFC communication logic's listening antenna coil 1122 and transfer its stored data from the NFC communication logic chip 1110 to the RFID reader 1150 by magnetic coupling with the RFID reader's antenna coil 1152.

An example NFC read-write function for the NFC-enabled wireless telephone 1100 would be an interactive banking application where account balances are first read from the NFC communication logic by the NFC reader 1140 and then updated and written back into the NFC communication logic by the NFC reader 1140. The selector 1130 operates under control of the NFC driver and server software 1104 to selectively connect the NFC chip 1110 to the reader-writer antenna coil 1120 to perform the NFC read-write function. The NFC chip 1110 operating in its NFC reader-writer mode under the control of the NFC driver and server software 1104, modulates the current through the NFC communication logic's reader-writer antenna coil 1120 and, through magnetic coupling with the NFC reader's antenna coil 1152, sends data to the NFC reader 1150 and demodulates current induced in the reader-writer antenna coil 1120 by the NFC reader's antenna coil 1152 to receive data from the NFC reader 1150 for storage in the wireless phone 1100.

Figure 12:
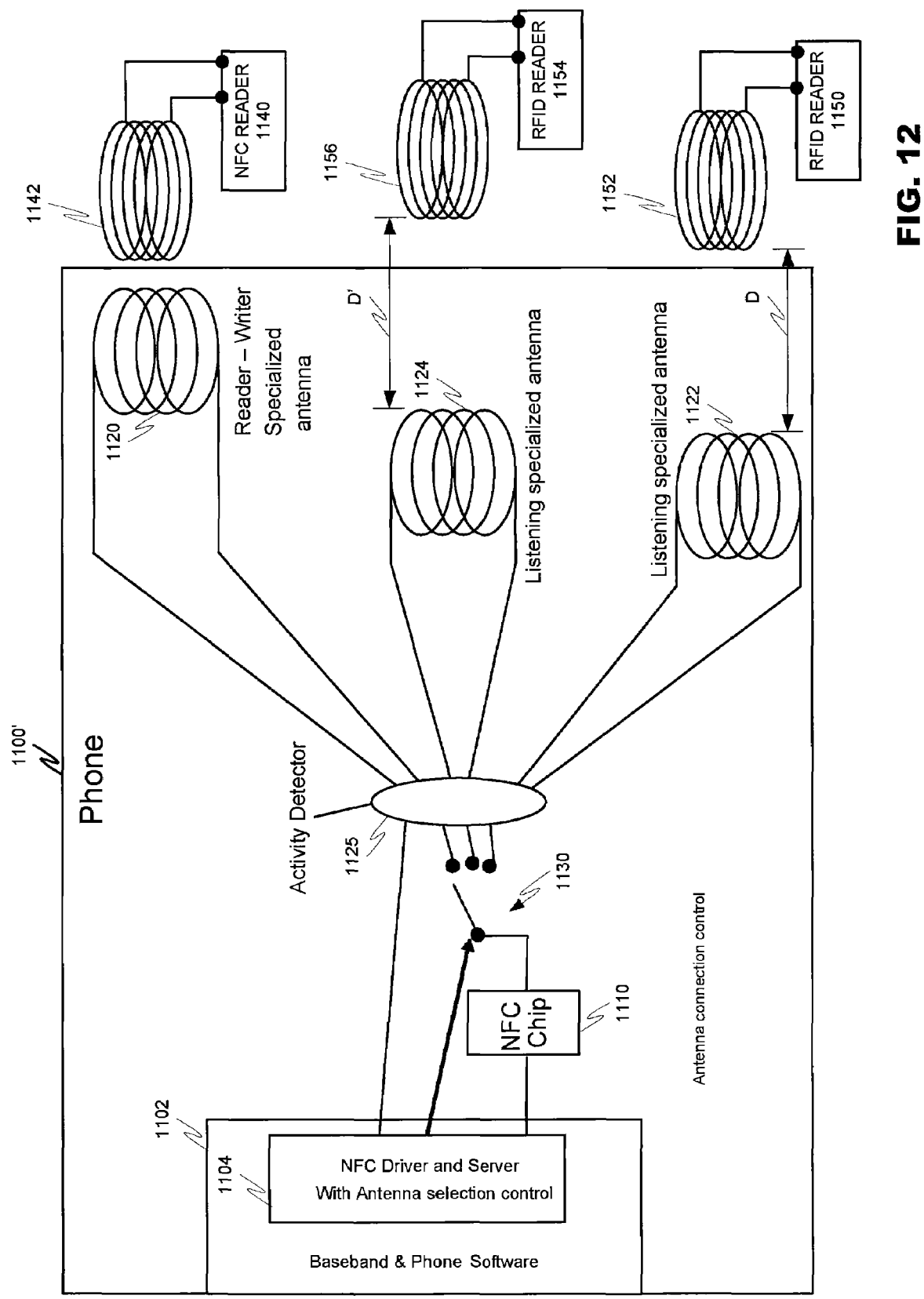
FIG. 12 is a circuit diagram of a wireless phone that includes a near field communications (NFC) chip selectively connected through an activity detector circuit to three antenna coils, one for reading and writing and the other two for listening.

FIG. 12 is a circuit diagram of a wireless phone 1100' that is a modification of the wireless phone 1100 in FIG. 11. The wireless phone 1100' of FIG. 12 has the near field communications (NFC) chip 1110 selectively connected by the selector 1130 and through an activity detector circuit 1125 to three antenna coils, one for the NFC reading and writing function and the other two for the RFID listening function. Different RFID listening applications require different minimum separation distances between the reader and the NFC communication logic. For example, the Mastercard RFID application currently requires a minimum of 4 centimeters separation distance from either side of the NFC communication logic card to the reader, whereas the Japan Railways Suica card RFID application requires a minimum of 10 centimeters separation distance from the NFC communication logic card to the reader. In FIG. 12, the NFC chip 1110 is selectively connected by the selector 1130 and the activity detector circuit 1125 to the NFC communication logic's reader-writer antenna coil 1120 when the activity detector circuit 1125 detects the close proximity of the NFC reader antenna coil 1142 with the NFC communication logic's reader-writer antenna coil 1120. The NFC chip 1110 is selectively connected by the selector 1130 and the activity detector circuit 1125 to the NFC communication logic's first listening antenna 1122 when the activity detector circuit 1125 detects the proximity of the first RFID reader antenna coil 1152 at a distance D. The NFC chip 1110 is selectively connected by the selector 1130 and the activity detector circuit 1125 to the NFC communication logic's second listening antenna 1124 when the activity detector circuit 1125 detects the proximity of the second RFID reader antenna coil 1156 at a distance D', which may be different from distance D. The NFC communication logic's first listening antenna 1122 and second listening antenna 1124 may be mounted on different sides of the wireless phone 1100'. The activity detector circuit 1125 detects the current induced in each respective antenna coil 1120, 1122, and 1124 and signals NFC chip 1110 when the electromagnetic field from the respective reader 1140, 1150, or 1154 is in close proximity to the respective antenna coil 1120, 1122, or 1124. The NFC driver and server software 1104 can control the control the selector 1130 and the activity detector circuit 1125 to sample the activity at the three antenna coils 1120, 1122, and 1124, enabling the NFC chip 1110 to distinguish between the NFC reader 1140, the first RFID reader 1150, and second RFID reader 1154 by reader identification data received from the respective readers 1140, 1150, and 1154. Additionally, the NFC driver and server software 1104 can control the selector 1130 to connect the NFC chip 1110 to any of the three antenna coils 1120, 1122, and 1124, either automatically or in response to a user command input to the phone.

Figure 13:
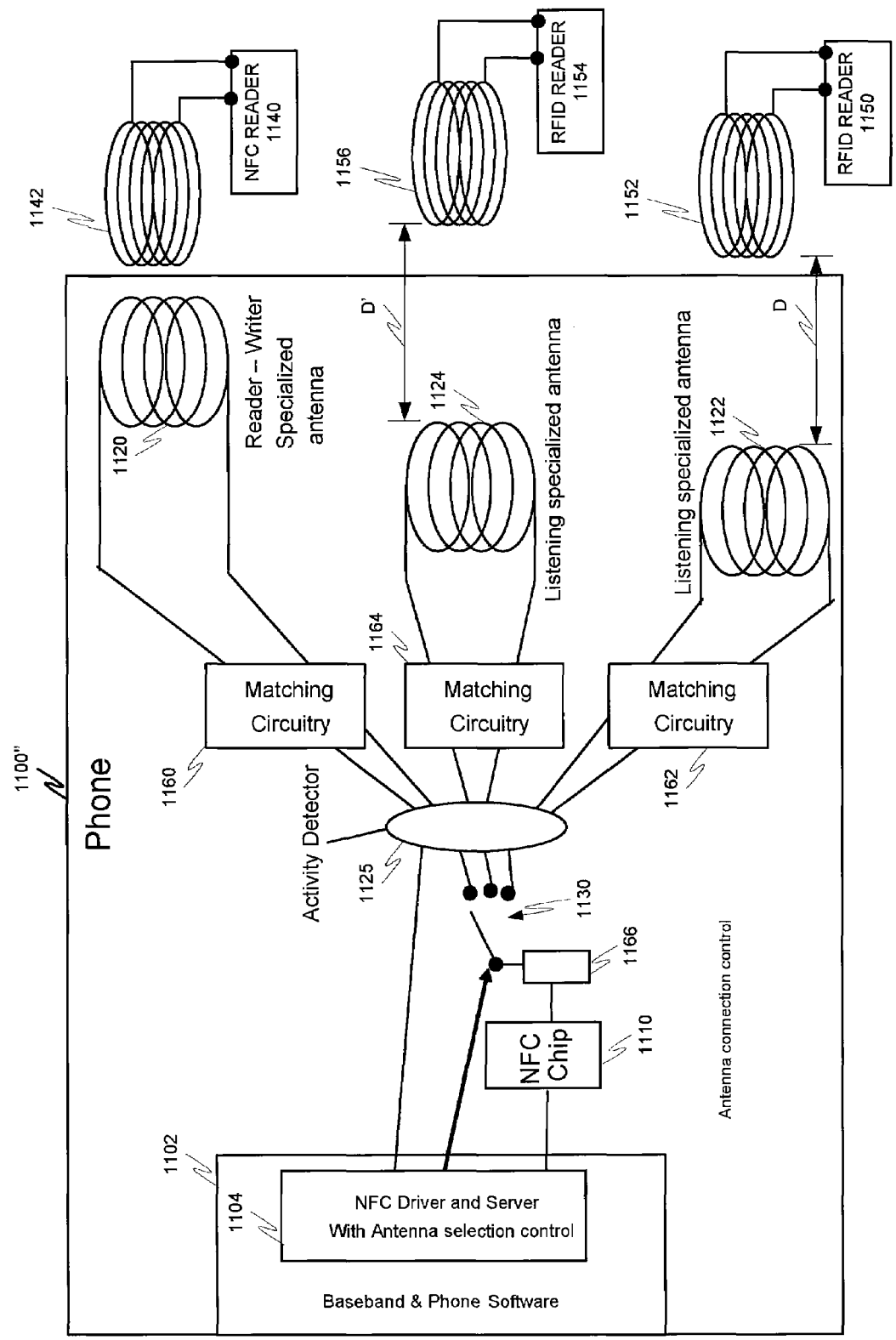
FIG. 13 is a circuit diagram of a wireless phone that includes a near field communications (NFC) chip selectively connected through an activity detector circuit and respective antenna matching circuits to three antenna coils, one for reading and writing and the other two for listening.

FIG. 13 is a circuit diagram of a wireless phone 1100" that is a modification of the wireless phone 1100' in FIG. 12. The wireless phone 1100" of FIG. 13 has respective antenna matching circuits 1160, 1162, and 1164 for the three antenna coils 1120, 1122, and 1124, to tune the resonant frequency of the RLC oscillator circuit for each antenna coil 1120, 1122, and 1124 in the NFC communication logic circuit. A programmable tuning circuit 1166 can also be included to enable the NFC driver and server software 1104 to selectively fine tune the RLC oscillator circuit for each antenna coil 1120, 1122, and 1124. Each matching circuit 1160, 1162, and 1164 has a capacitance, resistance, and/or inductance selected to establish a resonant RLC oscillator circuit tuned to the transmission frequency of the respective reader 1140, 1150, and 1154.

FIG. 14 shows example antenna positioning in the mobile phone 1100. FIG. 14 shows the antenna field shape 1120' for the NFC communication logic's reader-writer antenna coil 1120. FIG. 15 shows the antenna field shape 1122' for the NFC communication logic's listening antenna 1122. In an alternate embodiment of the invention, a foldable wireless phone (e.g., mobile phone 1100 having divided body 1100A and 1100B, which is disclosed in FIG. 14 in both an unfolded and folded configuration that encloses listening antenna 1122 in a faraday cage) or a wireless phone with slide cover 1180 as shown in FIG. 14 can have one of the listening antennas 1122 or 1124 placed so that closing the sliding cover 1180 will also cut all external access to the antenna by forming a Faraday cage around it. This design enables implementing a phone that has physical security to prevent unauthorized accessing of one of its listening antennas. The feature of cover closing cuts off the RFID reader field's access to the NFC communication logic's antenna, while the phone can still have other NFC communication logic antennas exposed for other applications. Further, the antenna can be coupled to a NFC/RFID modem without additional switches to enable exchanging data with the phone or other functionality even when the battery is off.

The resulting NFC-enabled wireless telephone has an optimized performance for both, NFC reading-writing functions and RFID listening functions. The resulting NFC-enabled wireless telephone enables specific design of the NFC communication logic's "read beam" to optimize magnetic coupling with various types of readers and it also optimizes the card-visible space around the phone. The provision of an activity selector combined with several listen antennas enables a fine grained control of how visible the phone is to external readers, thereby enabling the selective operation of a small antenna on a closed side of folded phone and selective disabling of a large antenna on the outside of a closed fold phone.

The present invention is an improvement over the prior art because the extension antenna system facilitates faster and more reliable communication for short-range machine-readable data. In at least the case of RFID communication, energy and information is reliably conveyed through an intelligent system of extension antennas. The intelligent antenna controller of the present invention also provides for a flexible system wherein multiple machine-readable tags may be used to impart different information to a user depending on the specific poster or sign on display. In this way, in at least one embodiment of the invention, the system improves the delivery of desired data to an information consumer.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. An apparatus, comprising:
   an antenna selector in a near field communications circuit, coupled to a first short-range antenna and to a second short-range antenna, programmed with antenna selection control software; and
   a near field communications logic chip selectively coupled through the antenna selector to either the first antenna or the second antenna, in response to programmed control of the antenna selector by the antenna selection control software.

2. The apparatus of claim 1, which further comprises:
   an activity detector coupled to the antenna selector, to the first antenna and to the second antenna, for detecting proximity of a reader with either the first antenna or the second antenna and signaling the antenna selector to couple the near field communications chip to the antenna detected as proximate to the reader.

3. The apparatus of claim 1, which further comprises:
   said first antenna being a reader-writer short-range antenna configured for optimum performance at short distances for near field communications functionality; and
   said second antenna being a listening short-range antenna configured for optimum performance at longer distances than that for the reader-writer antenna, for RFID functionality.

4. The apparatus of claim 1, which further comprises:
   said first antenna being a listening short-range antenna configured for optimum performance at a first distance for a first RFID functionality; and
   said second antenna being a listening short-range antenna configured for optimum performance at longer distances than that for the first antenna, for a second RFID functionality.

5. The apparatus of claim 1, which further comprises:
   a first antenna matching circuit coupled to the first antenna, for tuning a resonant frequency of the first antenna to a frequency of a first reader; and
   a second antenna matching circuit coupled to the second antenna, for tuning a resonant frequency of the second antenna to a frequency of a second reader.

6. The apparatus of claim 1, which further comprises:
   said antenna selector, first short-range antenna, second short-range antenna, and near field communications chip being integrated in a wireless phone.

7. The apparatus of claim 1, which further comprises:
   said antenna selector, first short-range antenna, second short-range antenna, and near field communications chip being integrated in a wireless phone having a moveable cover;
   at least said first short-range antenna being selectively shielded by closing the moveable cover forming a Faraday cage around the first short-range antenna to prevent unauthorized electromagnetic access to the first antenna.

8. The apparatus of claim 1, wherein the apparatus is a wireless handheld device.

9. The apparatus of claim 1, wherein the apparatus is wireless phone.

10. A method, comprising:
    detecting proximity of a reader with either a first antenna or a second antenna; and
    signaling an antenna selector to couple a near field communications chip to an antenna detected as proximate to the reader.

11. The method of claim 10, which further comprises:
    tuning a resonant frequency of the first antenna to a frequency of a first reader; and
    tuning a resonant frequency of the second antenna to a frequency of a second reader.

12. The method of claim 10, which farther comprises:
    said first antenna being a reader-writer short-range antenna configured for optimum performance at short distances for near field communications functionality; and
    said second antenna being a listening short-range antenna configured for optimum performance at longer distances than that for the reader-writer antenna, for RFID functionality.

13. The method of claim 10, which further comprises:
    said first antenna being a listening short-range antenna configured for optimum performance at a first distance for a first RFID functionality; and
    said second antenna being a listening short-range antenna configured for optimum performance at longer distances than that for the first antenna, for a second RFID functionality.

14. A computer program product comprising a computer readable medium having computer readable program code embodied in said medium, said computer readable program code comprising:
    a computer readable program code for detecting proximity of a reader with either a first antenna or a second antenna; and
    a computer readable program code for signaling an antenna selector to couple a near field communications chip to an antenna detected as proximate to the reader.

15. The computer program product of claim 14, which further comprises:
    a computer readable program code for tuning a resonant frequency of the first antenna to a frequency of a first reader; and
    a computer readable program code for tuning a resonant frequency of the second antenna to a frequency of a second reader.

16. The computer program product of claim 14, which further comprises:
    said first antenna being a reader-writer short-range antenna configured for optimum performance at short distances for near field communications functionality; and
    said second antenna being a listening short-range antenna configured for optimum performance at longer distances than that for the reader-writer antenna, for RFID functionality.

17. The computer program product of claim 14, which further comprises:
    said first antenna being a listening short-range antenna configured for optimum performance at a first distance for a first RFID functionality; and
    said second antenna being a listening short-range antenna configured for optimum performance at longer distances than that for the first antenna, for a second RFID functionality.

* * * * *

UNITED STATES PATENT AND TRADEMARK OFFICE
CERTIFICATE OF CORRECTION

PATENT NO. : 7,541,930 B2
APPLICATION NO. : 11/363940
DATED : June 2, 2009
INVENTOR(S) : Saarisalo et al.

It is certified that error appears in the above-identified patent and that said Letters Patent is hereby corrected as shown below:

Column 18

Line 9 (claim 12), "farther" should read --further--.

Signed and Sealed this

Second Day of February, 2010

David J. Kappos
*Director of the United States Patent and Trademark Office*